UNITED STATES PATENT OFFICE.

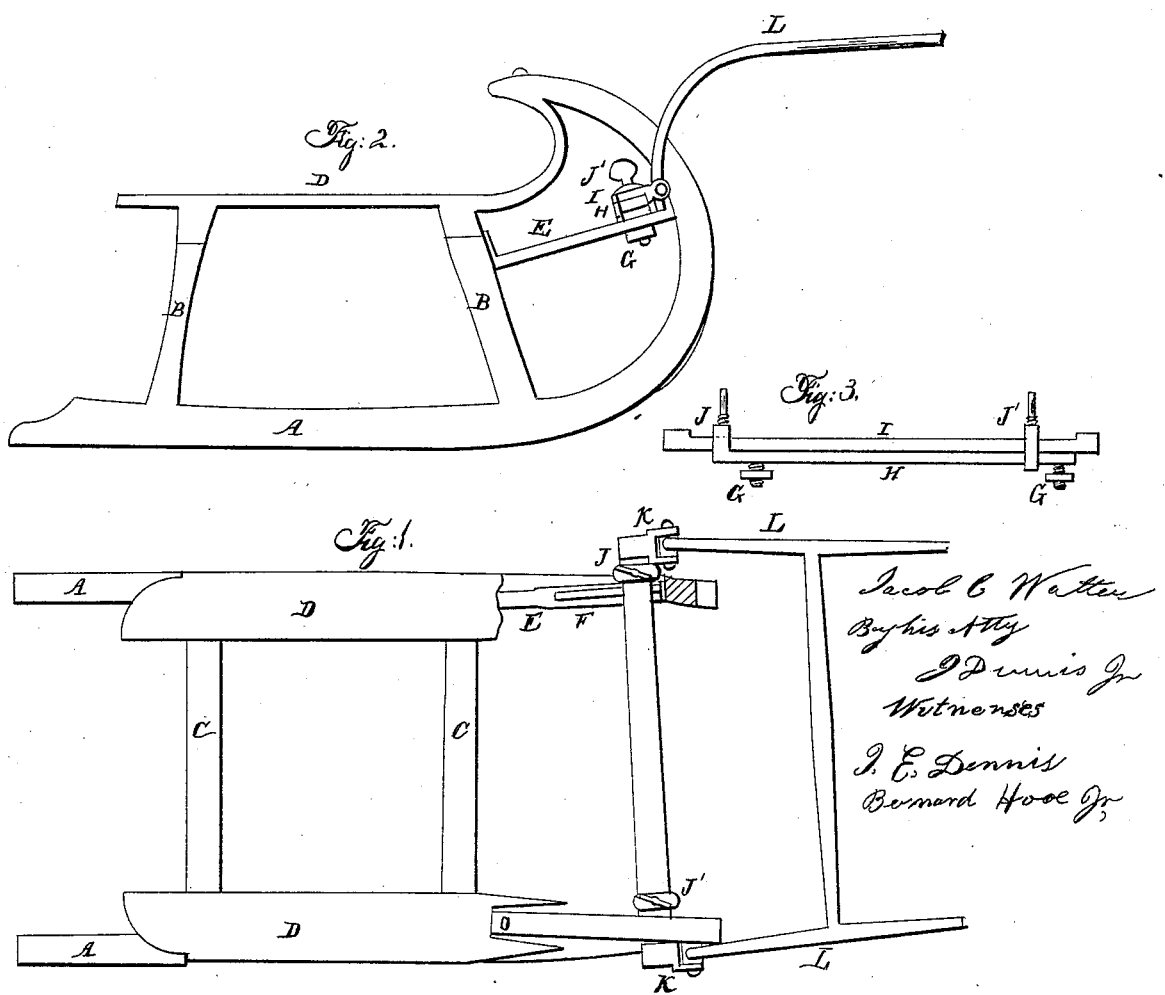

JACOB C. WALTER, OF LEONARDSVILLE, NEW YORK.

IMPROVEMENT IN CONNECTING SHAFTS OR THILLS TO SLEIGHS.

Specification forming part of Letters Patent No. 37,651, dated February 10, 1863.

*To all whom it may concern:*

Be it known that I, JACOB C. WALTER, of Leonardsville, in the county of Madison and State of New York, have invented certain new and useful improvements in devices for or the mode of connecting shafts or thills to sleighs; and I do hereby declare that the same are described and represented in the following specifications and drawings.

To enable others skilled in the art to make and use my improvements, I will proceed to describe their construction and operation, referring to the drawings, in which the same letters indicate like parts in each of the figures.

Figure 1 is a plan or top view of my improvements. Fig. 2 is a side elevation of the same. Fig. 3 is an elevation of the rear of the adjustable traversing-bars.

The nature of my invention and improvements in the mode of connecting shafts or thills to sleighs consists in so constructing and arranging them that they may be adjusted laterally, to adapt the runners to the track to be traveled, in combination with a proper construction and arrangement, for changing and adjusting the angle of the shafts with the runners.

In the accompanying drawings, A A are the runners of the sleigh; B B, the standards; C C, the girders, and D D the top rails of the frame of the sleigh, which may be made in the form shown, or in such other form as will answer the purpose. The forward standards are connected to the runners by the bars E E, (shown in the drawings,) which bars are provided with slots F for the bolts G, which hold the bar H in the position required on the bars E E. The bar I is made longer than the bar H, and placed right over it, as shown in the drawings. The bar I is held in place on the bar H by the rings J J', which are provided with set-screws, (shown in the drawings,) so that when the bar I is placed in the position required on the bar H it may be clamped fast by the set-screws, and held firmly. The ring J is formed by perforating the end of the bar H and turning it up at a right angle to the bar. The ring J' is made separate and surrounds both the bars H and I. The stands or eyes K K are fastened to the bar I, to which stands the rear ends of the shafts L L are fastened, so as to vibrate freely perpendicularly when required.

From the foregoing description it may be perceived that by loosening the screws in the rings J J', the bar I may be moved so as to make the runners travel in the desired track, and that by loosening the bolts which fasten the bar H to the bars E E, the position of the bar H may be changed to vary the angle of the shafts with the runners to the position desired, and the slots F in the bars E are so long that the bar H may be moved back so near the standards B as to allow the hind legs of the horse to come between the fore ends of runners and thus permit the horse to throw the balls from his feet under the bottom of the sleigh.

I contemplate that skillful artisans may modify my invention and improvements in various ways, and adapt them to the circumstances in which they may use them, and still retain the merits and principles which I have invented, and that some rings or stands, with projecting bolts to pass through the slots in the bars E E, may be used to hold the bar I, and dispense with the bar H, if preferred that way.

I believe I have described and represented the improvements which I have invented so as to enable any person skilled in the art to make and use them without further invention or experiment.

I will now state what I desire to secure by Letters Patent—viz:

In combination with the mechanism, or its equivalent, for changing the relative position of the shafts or thills laterally, the devices or their equivalents for changing or setting the thills forward or back, substantially as described.

JACOB C. WALTER.

Witnesses:
 DENNIS HARDEN,
 DANIEL HARDEN.